W. R. McKEEN & W. D. BURTON.
MOTOR TRUCK.
APPLICATION FILED JUNE 23, 1913.
1,111,915.
Patented Sept. 29, 1914.
2 SHEETS—SHEET 1.
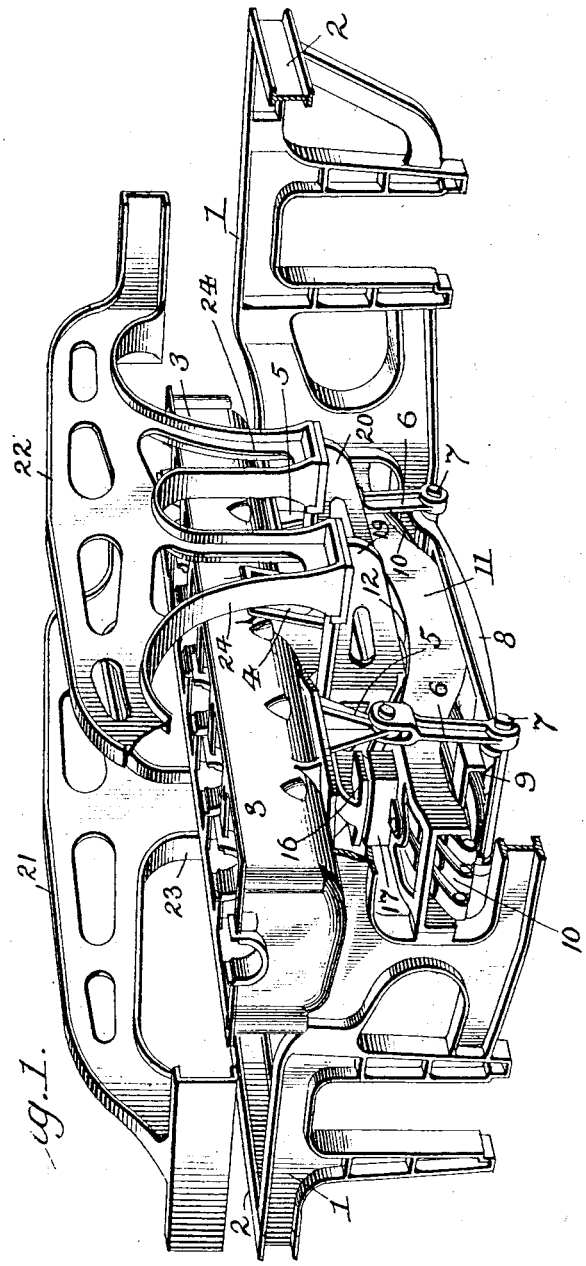
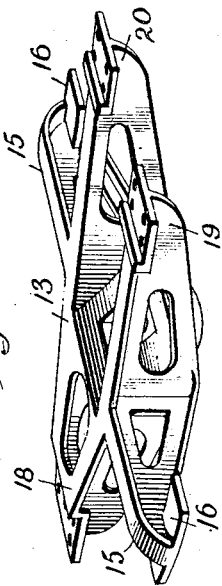
Witnesses:
C. H. Raider
Fannie Wise
Inventors:
William R. McKeen
Warren D. Burton,
By Dodge & Sons.
Attorneys.

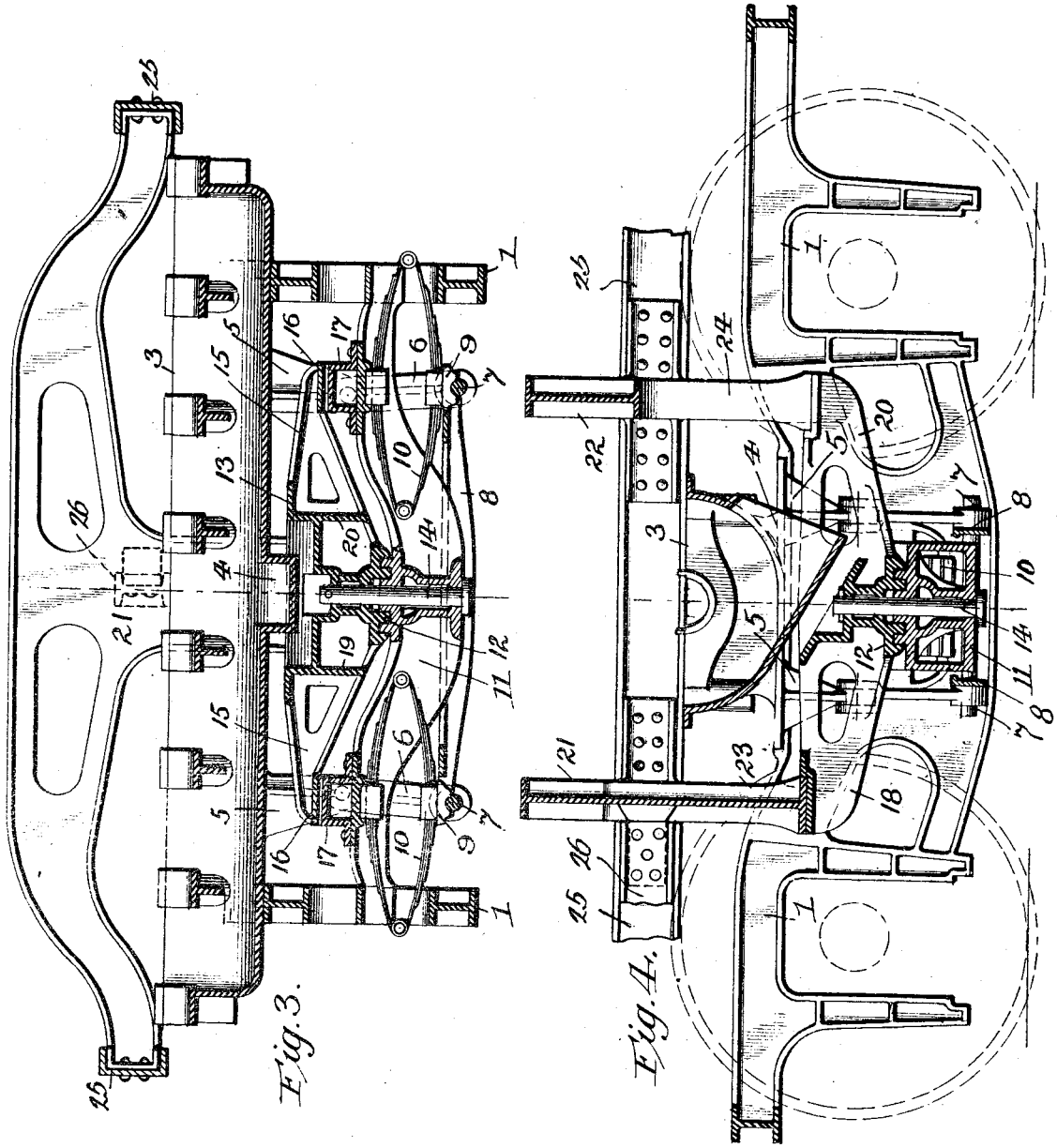

UNITED STATES PATENT OFFICE.

WILLIAM R. McKEEN AND WARREN DEAN BURTON, OF OMAHA, NEBRASKA, ASSIGNORS TO McKEEN MOTOR CAR COMPANY, OF OMAHA, NEBRASKA, A CORPORATION OF NEW JERSEY.

MOTOR-TRUCK.

1,111,915.      Specification of Letters Patent.      Patented Sept. 29, 1914.

Application filed June 23, 1913. Serial No. 775,358.

*To all whom it may concern:*

Be it known that we, WILLIAM R. McKEEN and WARREN DEAN BURTON, citizens of the United States, residing at Omaha, in the county of Douglas and State of Nebraska, have invented certain new and useful Improvements in Motor-Trucks, of which the following is a specification.

Our invention relates to certain improvements in bogey motor trucks for railway motor cars of that type in which the motor, usually an internal combustion motor, is mounted directly upon the truck.

The purpose of the invention is to increase the strength of the truck, reduce the number of parts, lower the center of gravity of the combined truck and motor, reduce the clearance between the motor and the car body necessary to permit the usual swiveling of the truck, and generally to improve the construction of this class of device and secure a number of incidental advantages which will readily be recognized by those skilled in the art.

An embodiment of the invention which has proved successful in actual use is illustrated in the accompanying drawings, wherein:—

Figure 1 is a perspective view of the body bolsters and center bearing casting assembled with the truck frame, spring plank, and truck bolster, certain parts being partially broken away; Fig. 2 is a perspective view of the center bearing casting, detached from the body bolster; Fig. 3 is a transverse axial section of the parts illustrated in Fig. 1; and Fig. 4 is a longitudinal axial section of the same.

The side frames 1 and the end frames 2 of the truck do not differ substantially from those common in the art. The side frames may be and preferably are steel castings. The bearing boxes, equalizer mechanism and kindred parts are of standard construction and as their form is not involved in the present invention, they have been omitted from the drawings.

The motor frame or base 3 is of a form suited to the engine used. In the drawings it is illustrated as including the base and part of the crank case of a six cylinder gas engine. The base 3 rests on and is securely bolted at its ends to the side frames 1 at their middles. The base 3 thus becomes the truck transom and combines in a single piece the functions of the engine base and the truck transom. The lateral opening 4 in the base is for the passage of the drive chain to the usual change speed gear and driving axle (not shown).

Depending from the lower side of the base 3 are four link hanger pivot lugs 5 to which are pinned four swing links 6. These in turn are pinned at 7 to the spring plank 8 having spring pockets 9. Ordinary bolster springs 10 are mounted in the spring pockets 9 and support the truck bolster 11 in the usual manner, with its ends guided in openings in the side frames. The truck bolster 11 is formed with an integral center plate 12 upon which rests the center casting 13, connected by a center or king pin 14.

The center casting 13 is of the form most clearly shown in Fig. 2. It has lateral extensions 15 terminating in side bearings 16 which rest on companion side bearings 17 carried on the truck bolster 11. The center casting also has three longitudinal arms. One arm 18 extends in one direction and the other two arms 19 and 20 extend in the opposite direction parallel to each other. The purpose of using two extensions 19 and 20 is to give clearance for the passage of the drive chain above mentioned. Another advantage is the securing of a three point support for the body bolsters, which gives satisfactory stability without subjecting the center plate to twisting stresses.

Two body bolsters 21 and 22 are used, the bolster 21 having a single downward extension 23 and the bolster 22 two downward extensions 24. The arm 18 is bolted to extension 23 and the arms 19 and 20 to the extension 24. The bolsters 21 and 22 are connected to the side sills 25 as shown. In the particular type of car in which we have used this truck the side plates and framing carry substantially the entire load of the car. The center sill 26 extends forward only to the rear side of the body bolster 21, so that the space between the body bolsters 21 and 22 is clear. In cars having other types of framing the body bolsters 21 and 22 might assume somewhat different forms in order properly to support the car body, and any arrangement which will permit the proper clearance for the swiveling of the motor with the truck will suffice. We do not limit ourselves to the particular mode of connecting the bolsters to the car body, above suggested.

From the above it will be observed that the motor is supported directly above the king or center pin, instead of forward or rearward thereof as heretofore. This secures a better distribution of weight and avoids any lateral movement of the motor as the truck swivels. This last feature is of the greatest importance in narrow gage cars in which the possible clearance for such movement is very limited and also in all cars required to take curves of short radius. The weight of the car is supported at a very low point in the truck, thus contributing to the stability of the latter. The use of the combined transom and motor base reduces the weight of the truck and the number of its parts without detracting from its strength.

Although we have described the invention as applied to a truck of the "swing motion" type and regard that type as preferable for the service, nevertheless, certain of the advantages of the invention might be secured with other types of truck. It is also obvious that while the use of two body bolsters together with a center plate bridging between them gives a very desirable distribution of load, the invention might be adapted for use with a single bolster. It is only necessary that the bolster be of such form as to extend beneath the motor base and rest upon the truck bolster. We, therefore, do not limit ourselves to the specific arrangement shown, although that is preferred.

Having thus described our invention, what we claim is:—

1. The combination with a truck having a transom and a truck bolster mounted directly beneath said transom, of a body bolster having a portion adapted to extend beneath said transom and rest on said truck bolster; and suitable pivotal connections between said bolsters.

2. The combination with a truck structure including a truck frame, truck bolsters and center bearing, of a motor base mounted upon said frame above said center bearing, and a body bolster structure having a portion extending beneath the motor base and resting upon said center bearing.

3. The combination with a truck structure including a truck frame, truck bolster, center bearing and side bearings, of a motor base mounted upon said frame above said center bearing, and a body bolster structure having a portion extending beneath the motor base and entering into coactive relation with said center and side bearings.

4. The combination with a truck structure including a truck frame, spring plank, bolster springs, and truck bolster provided with the usual bearings, of a motor base mounted on said frame over said truck bolster; and a body bolster structure having a portion extending beneath said motor base and entering into coactive relation with the bearings on said truck bolster.

5. The combination with a truck structure including a truck frame, spring plank, bolster springs, and truck bolster provided with the usual bearings, of a motor base mounted on said frame over said truck bolster; a pair of body bolsters at opposite sides of the motor base; and a center plate connected to said body bolsters, extending beneath the motor base and entering into coactive relation with the bearings on said truck bolster.

6. The combination of a truck frame; a combined truck transom and motor base mounted on said frame; a spring plank mounted beneath said transom, swing links connecting said transom and spring plank; bolster springs on said plank; a truck bolster on said springs and provided with the usual bearings; and a body bolster having a portion extending beneath said transom in coöperative relation with said bearings.

7. The combination of a truck frame; a combined truck transom and motor base mounted on said frame; a spring plank mounted beneath said transom; swing links connecting said transom and spring plank; bolster springs on said plank; a truck bolster on said springs and provided with the usual bearings; a pair of body bolsters at opposite sides of said transom; and a center plate connected to said body bolsters and extending beneath said transom in coöperative relation with the bearings on said truck bolster.

In testimony whereof we have signed our names to this specification in the presence of two subscribing witnesses.

WILLIAM R. McKEEN.
WARREN DEAN BURTON.

Witnesses:
FRANK J. JUMPER,
HARRY N. PARSONS.